2,232,475

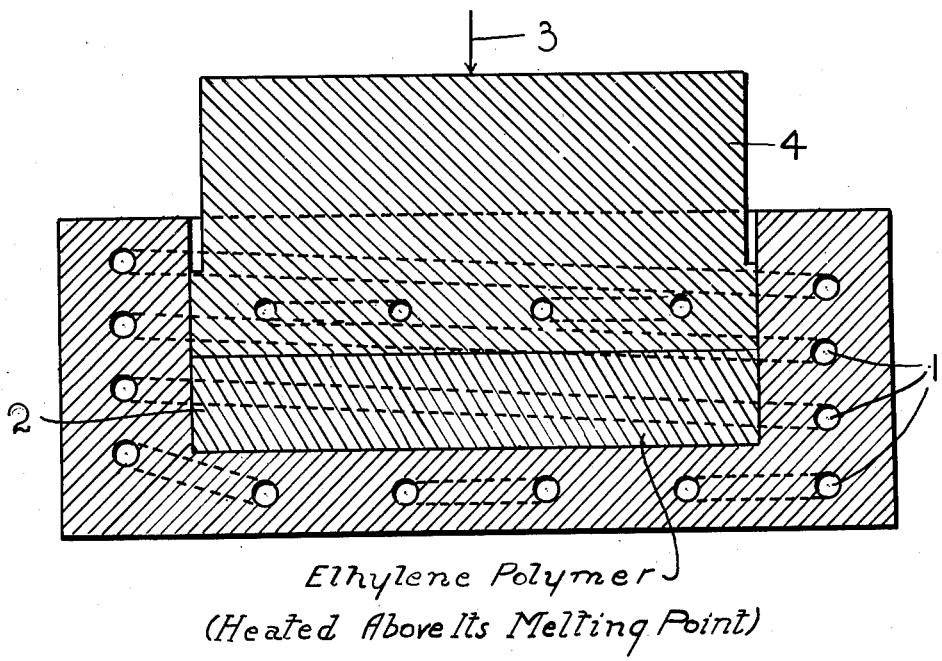
Ethylene Polymer
(Heated Above Its Melting Point)
Inventors
Archibald Renfrew
James W. Davison Patented Feb. 18, 1941

UNITED STATES PATENT OFFICE 2,232,475

PROCESS OF MOLDING POLYETHYLENE

Archibald Renfrew and James William Davison, Norton-on-Tees, England, assignors to Imperial Chemical Industries Limited, a corporation of Great Britain Application April 18, 1939, Serial No. 268,628
In Great Britain April 19, 1938

1 Claim. (Cl. 18—55)

This invention relates to the art of molding polymeric materials, and more particularly to compression molding of polymerized ethylene.

The ethylene polymers used in the practice of this invention are those prepared as described in application Serial Number 123,722, filed February 2, 1937, by a process which consists in subjecting ethylene to a pressure in excess of 500 atmospheres under controlled elevated temperature conditions. This procedure results in polymers of ethylene, the molecular weight of which varies depending particularly upon the pressure employed. By using pressures of more than 1000 atmospheres, solid polymers are formed and under these conditions the polymerization reaction takes place, requiring several hours for completion. These polymers may also be made (in accordance with the process described in application Serial Number 157,810) by including in the ethylene a small quantity of oxygen which may be as little as 0.01% but preferably 0.03% to 0.10% at 1500 atmospheres and 190° to 210° C. The pressures are at least 500 atmospheres and preferably at least 1000 atmospheres and below 3000 atmospheres. The temperatures are between 100° C. and 400° C. and more particularly from 150° C. to 250° C. Thus, as a specific instance of obtaining the solid polymers, ethylene containing 0.05% oxygen is compressed in a steel bomb to a total pressure of 1500 atmospheres and heated rapidly to 210° C., whereupon a very sudden rise in pressure followed by a slow drop in pressure is observed. After five hours' heating at 210° C. the pressure is released and the product cooled. Under these conditions an 80% yield of the solid polymer, based on the ethylene used, is obtained.

The ethylene polymers obtained as outlined above melt at temperatures in excess of 100° C. and generally within the range of about 110° C. to about 200° C., have an average molecular weight in excess of 4000, are essentially saturated products corresponding in composition substantially to $(CH_2)_x$, and when subjected to X-ray diffraction analysis show a crystalline structure. These polymers are soluble in xylene at its boiling point, are unaffected by prolonged contact with air at ordinary temperature, and are characterized by the fact that they can be formed into films and filaments which yield oriented products on application of stress herein referred to as "cold drawing." The oriented products furnish fiber diffraction patterns on examination with X-rays and exhibit birefringence and parallel extinction when observed under crossed Nicol prisms.

The compression molding of polymerized ethylene which is the subject of the present invention, differs widely in many respects from the conventional practice.

In the compression molding of thermoplastic materials it has hitherto been customary to heat the materials in a mold to a temperature at which they can be shaped, at which temperature pressure is applied, after which the mold and its contents have been allowed to cool at a pressure not substantially less than the molding pressure. This technique has been generally followed and has given satisfactory results with a large variety of thermoplastic materials.

This invention has as an object a new and improved method for making shaped articles from polymerized ethylene. A further object is a method for the successful compression molding of polymerized ethylene. Other objects will appear hereinafter.

These objects are accomplished by molding under pressure polymerized ethylene polymer at a temperature higher than the melting point of the polymer.

We have now found that the compression molding of polymerized ethylene cannot be satisfactorily carried out by the procedure used in the prior practice pointed out above. We have found that the solid polymers of ethylene give compression moldings of good mechanical quality only when molding is carried out at a surprisingly high temperature, not less in fact than the melting point of the polymerized ethylene. Thus polymerized ethylene when molded at temperatures appreciably below the melting point, although they may have homogeneous and satisfactory appearance, have mechanical properties so poor as to render them useless. The term "melting point" as used herein is determined and defined by the specific empirical method hereinafter defined. The "melting point" as thus determined and defined is substantially higher than the softening point as determined by conventional methods.

The "melting point" of the polymerized ethylene for the purposes of the present invention is determined as follows:

A circular disc of the polymerized ethylene composition having a diameter of 0.25" and thickness 0.125" is placed on a flat horizontal steel surface. It is then subjected over the whole of its area to a load of 1 Kgm., applied by means of a steel cylinder which rests upon the upper surface of the test piece. The whole apparatus is then placed in a hot air oven, the steel plate and disc being connected to an Ames dial whereby any relative movement between them may be read and/or recorded. The temperature of the oven is then raised at a standard rate of 50° C. per hour and the readings of the Ames dial are plotted against temperature. At or around the "melting point," the deflection of the Ames dial rises sharply with increase in temperature. The "melting point" for the purposes of this specification is taken as the temperature reading corresponding to the point of intersection of the temperature axis with the extrapolation of the substantially vertically straight portion of the curve.

The curves obtained by plotting the temperature as abcissa and deflections as ordinate show melting points of 110° C. and 116° C., respectively.

In view of the fact that temperatures above the melting point are employed, it is essential that high pressure be not exerted on the mold until the time that, or after, cooling has started.

Apparatus for carrying out our invention is illustrated by the single figure in the drawing which shows a cross section of a mold within which the ethylene polymer is adapted to be heated and compressed.

The mold shown is designed for the production of molded circular discs and comprises a mold block having a cylindrical bore into which fits the piston 4. Heating coils 1 in the mold block are provided to melt the ethylene polymer which is contained in the space 2 below the piston and which is compressed by application of pressure in the direction of the arrow 3.

Our invention is further illustrated by the following examples.

*Example I*

A compression mold of the kind illustrated in the drawing which is designed to produce a disc of diameter 9" and thickness 1½" was heated to 130° C. and was then filled with 3 lbs. of polymerized ethylene having a melting point of 116° C. as determined by the method described above. After filling, the mold was closed without application of pressure and allowed to remain at 130° C. for half an hour. The temperature of the mold was then allowed to fall to 100° C. the pressure being at the same time raised gradually to 650 lbs./in.$^2$, after which the temperature was still further lowered to 90° C., while the pressure was concomitantly increased to 1100 lbs./in.$^2$. The mold was then allowed to cool to room temperature, the final pressure of 1100 lbs./in.$^2$ being maintained throughout the cooling. The mold was then opened and a disc of homogeneous, translucent, flexible ethylene polymer of high strength was obtained.

*Example II*

The procedure given in the foregoing example was repeated with the exception that the mold was initially heated only to 125° C. and the ethylene polymer had a melting point of 111° C. As in Example I, a homogeneous, translucent, flexible molded product of high strength was obtained.

Usually the melting point of polymerized ethylene as defined and determined by the above mentioned test is within the temperature range 100–120° C., but since the melting point is largely dependent upon the molecular weight of the polymer, we do not limit ourselves to this temperature range but purely by the empirical definitions of melting point as hereinbefore explained. In general, a molding temperature about 10° C. higher than the melting point is satisfactory.

The risk of obtaining shrinkage marks and other flaws in the molding is materially reduced by the preferred practice of our invention in which the pressure is increased slightly when the temperature has fallen to about 90° C.

When desired fillers or modifiers may be present in the molded products prepared in accordance with our invention. In general, it is advisable to make a preliminary test to determine the melting point as hereinbefore defined, since it is seldom possible to prophesy with accuracy the effect of a given modifier on the melting point of a thermoplastic material. In many cases we have found that inert fillers do not markedly affect the melting point of polymerized ethylene, but this cannot be taken as a general rule and a preliminary determination is always desirable.

Although the pressure to be applied in our process of compression molding will depend to some extent upon the complexity of the mold employed, a further advantage of our method is that the molding pressure required is very much lower for any given mold than that hitherto necessary.

The present invention is applicable to the production of a wide variety of articles of intricate as well as of simple shape. Films of the ethylene polymers have remarkable water-impermeability which with other desirable characteristics makes them valuable in the manufacture of containers, as for instance milk containers, tooth-paste tubes, and the like.

The invention is particularly useful for the fabrication of caps and containers of all sorts. The caps may be made either by direct molding or by tooling from a molded rod of the polymer, and the containers by direct molding.

As many apparently widely different embodiments of this invention may be made without departing from the spirit and scope thereof, it is to be understood that we do not limit ourselves to the specific embodiments thereof except as defined in the appended claim.

We claim:

In a process for the compression molding of a polymer of ethylene which conforms in composition substantially to $(CH_2)_x$ and which by X-ray diffraction analysis shows a crystalline pattern, the steps comprising heating said polymer at least 10° C. above its melting point in a mold under pressure, cooling the polymer in the mold, and increasing the pressure during the cooling of the charged mold.

ARCHIBALD RENFREW.
JAMES WILLIAM DAVISON.